United States Patent
Tang

(10) Patent No.: US 6,568,616 B1
(45) Date of Patent: May 27, 2003

(54) HAND-HELD CONDIMENT GRINDER

(75) Inventor: George Tang, Kowloon (HK)

(73) Assignee: Samson Bright Industrial Co. Ltd., Hong Kong (HK)

( * ) Notice: Subject to any disclaimer, the term of this patent is extended or adjusted under 35 U.S.C. 154(b) by 0 days.

(21) Appl. No.: 10/269,457

(22) Filed: Oct. 11, 2002

(51) Int. Cl.⁷ ................................................ A47J 42/34
(52) U.S. Cl. ........................................ 241/168; 241/169
(58) Field of Search ................................ 241/168, 169, 241/DIG. 27, 100

(56) References Cited

U.S. PATENT DOCUMENTS

| | | | | |
|---|---|---|---|---|
| 2,876,956 A | * | 3/1959 | Bentley | 241/168 |
| 4,573,244 A | * | 3/1986 | Holcomb et al. | 241/169 |
| 5,199,655 A | * | 4/1993 | Yang | 241/169 |
| 5,988,543 A | * | 11/1999 | Wu | 241/168 |

* cited by examiner

Primary Examiner—John M. Husar
(74) Attorney, Agent, or Firm—Robert D. Katz; Cooper & Dunham LLP

(57) ABSTRACT

A condiment grinder includes a housing, a chamber within or attached to the housing for containing articles to the ground such as pepper seeds. A trigger is attached to the housing. An elongate piston extends through the chamber and has serrations along a portion of its length. A linkage co-operates with the trigger and the piston to transmit reciprocal movement of the trigger to reciprocal movement of the piston. A grinding aperture adjacent to the chamber has an internal periphery and is co-operative throughout its internal periphery with the serrations of the piston to grind the articles upon reciprocation of the piston.

9 Claims, 4 Drawing Sheets

HAND-HELD CONDIMENT GRINDER

BACKGROUND OF THE INVENTION

The present invention relates to a hand-held condiment grinder. More particularly, although not exclusively, the invention relates to a hand-held pepper grinder for storing pepper seeds and dispensing pepper grinds upon reciprocal movement of an activation trigger.

A grinder is disclosed in U.S. Pat. No. 4,697,749. The grinder includes a lever 80 having an arm 86 that presses downwardly on a slide member 88. The slide member 88 passes through a compartment 55 within which the pepper seeds are located and includes a flat serrated face. The serrations co-operate with a flat shearing edge 63 to grind the pepper seeds in the compartment 55 for dispensation of the pepper grinds through the base of the grinder. Only one face of the slide member is serrated and the other faces of the member are wasted in terms of producing any grinding effect. This means that lever 80 must be activated an unnecessarily high number of times to dispense the grinds. Also, the length of the lever 80 with respect to the length of the arm 86 is high meaning that large movements of the lever translate to small movements of the slide member 88. This is a generally inefficient design.

Various other hand-held condiment grinders are known, but most suffer from similar efficiency constraints.

OBJECTS OF THE INVENTION

It is an object of the present invention to overcome or substantially ameliorate at least one of the above disadvantages and/or more generally to provide improved hand-held condiment grinder.

DISCLOSURE OF THE INVENTION

There is disclosed herein a condiment grinder comprising:
a housing,
a chamber within or attached to the housing for containing articles to be ground,
a trigger attached to the housing,
an elongate piston extending through the chamber and having serrations along a portion of its length,
a linkage co-operative with the trigger and the piston to transmit reciprocal movement of the trigger to reciprocal movement of the piston,
a grinding aperture having an internal periphery, the aperture positioned adjacent to the chamber and co-operative throughout its internal periphery with the serrations of the piston to grind the articles upon reciprocation of the piston.

Preferably the piston is substantially cylindrical.
Preferably the serrated portion is substantially cylindrical.
Preferably the aperture is formed between a pair of grinding blocks, each having a concave recess, the recesses facing one another to define said aperture.

Preferably one of the grinding blocks is fixed with respect to the chamber and the other is movable toward or away from the fixed grinding block.

Preferably the grinder includes an adjustment knob co-operative with the movable grinding block.

Preferably the piston fits within a bore of the housing.
Preferably a spring surrounds the piston and extends through the bore, one end of the spring bearing upon a wall of the chamber and the other end of the spring bearing on the piston to bias the piston to a position whereat the linkage moves the trigger to a rest position.

Preferably the linkage includes a first link mounted pivotally to the housing and a second link connected pivotally to be piston.

Preferably the first and second links are hingedly interconnected to one another.

Preferably the trigger makes a sliding contact with the hinged interconnection of the first hand second links.

Preferably the trigger is mounted pivotally to the housing.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
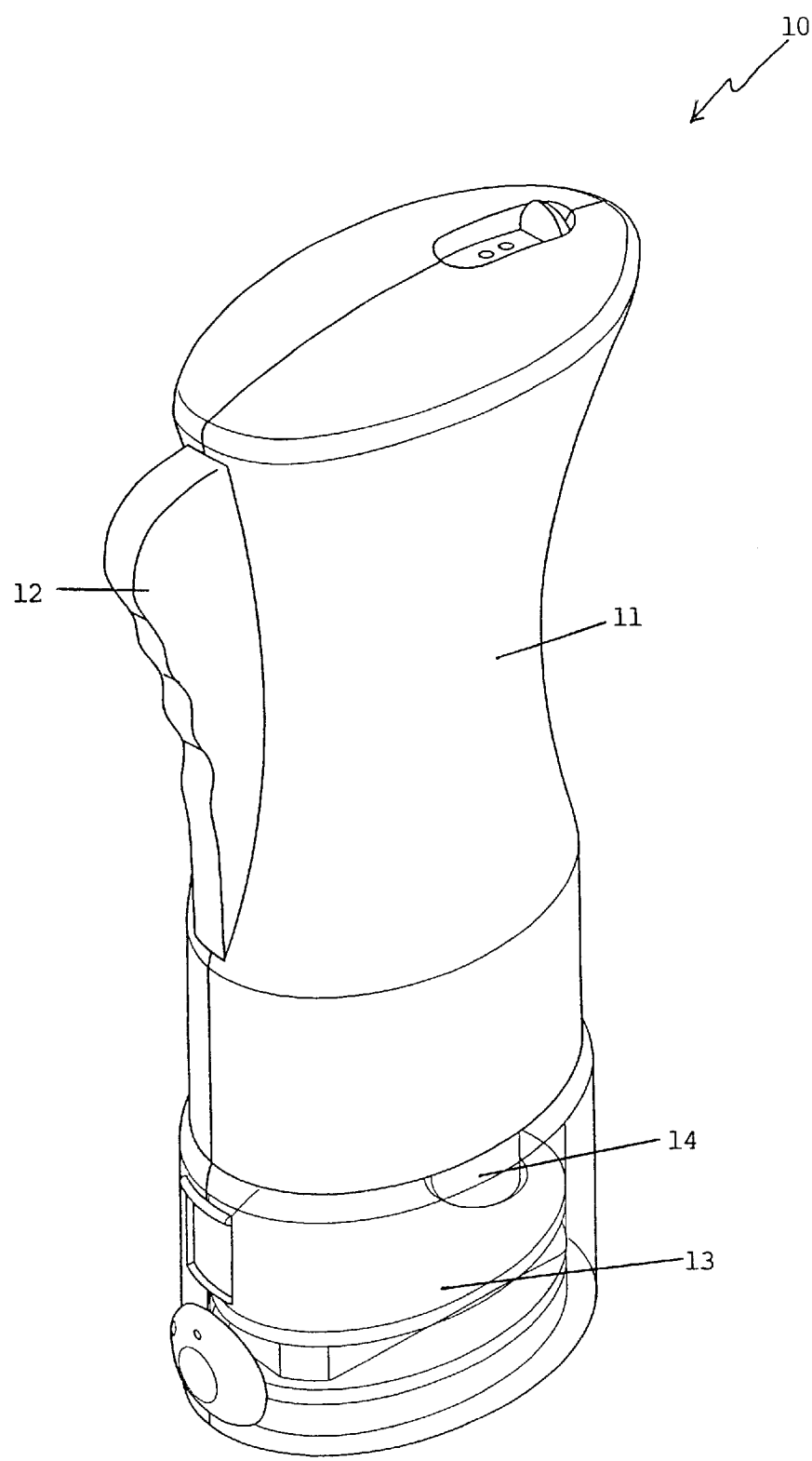
FIG. 1 is a schematic perspective illustration of a pepper grinder.

In the accompanying drawings there is schematically depicted a pepper grinder 10. The grinder 10 can be used to grind pepper seeds, or any other seeds or particulates. For example, sea salt, mustard seeds, chili pieces etc. might be ground with the device.

The grinder 10 includes a plastic housing 11 having projecting therefrom an activation trigger 12. At the base of the housing 11, there is provided a chamber 13 within which pepper seeds or other items to be ground are housed. The chamber 13 is typically made of light-transmissive material. The material might be transparent plastic material for example. The ability to see through the chamber walls enables one to gauge whether or not the chamber 13 needs to be replenished with items to be ground.

At the top of the housing 11 there is provided a subsidiary chamber 32 having a perforated cover 33. Salt for example might be housed within the subsidiary chamber 32 for dispensation through the perforated cover 33 upon inversion of the housing. The cover 33 can slide back and forth within a slot 34 as desired to replenish the subsidiary chamber 32 with salt or other fine material.

The trigger 12 is pivotally connected at 35 to the housing 11 and includes a pin 36 co-operating with a slot 37 to define the extent of pivotal movement of the trigger 12.

Situated behind the trigger 12, there is provided a linkage comprising a first link 17 attached pivotally at 19 to the housing 11. The first link 17 is located within a space 29, opposite walls of which define the extent of pivotal movement of the first link 17 about pivot point 19.

Hingedly interconnected at elbow 20 to the first link 17 is a second link 18, the bottom end of which is attached pivotally at 21 to the top of an elongate piston 14. The second link 18 is constrained within a space 30, opposite walls of which define the limit of orientation of the second link.

The hinged interconnection elbow 20 of the first and second links 17 and 18 forms a sliding interengagement with the back surface of the trigger 12.

Piston 14 is typically of circular cross-section and passes through a circular vertical bore 23 in the housing 11. A coil compression spring 22 extends through the bore and surrounds a portion of the piston 14. The bottom end of the coil spring bears against an upper wall 31 of the chamber 13. The spring biasses the piston 14 upwardly and thereby forces the linkage into the position depicted in FIG. 3 whereat the trigger 12 is at its rest position.

Figure 3:
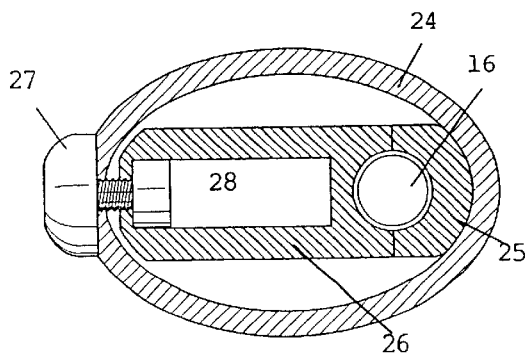
FIG. 3 is a schematic cross-sectional plan illustration of the pepper grinder of FIG. 1.

The bottom cylindrical portion 15 of the elongate piston 14 is serrated. The serrations extend the whole way throughout the periphery of the bottom portion of the piston. This serrated portion 15 passes through an aperture 16 formed by co-operating grinding blocks 25 and 26. As shown in FIG. 3, there is a fixed grinding block portion 25 attached to the chamber wall 24 and a movable, larger grinding block portion 26 mounted to move laterally with respect to the chamber 13. The cooperating grinding blocks 25 and 26 define a circular aperture 16 when touching one another. This circular aperture corresponds with the out-most size and shape of the serrated portion 15 of the piston 14. The aperture 16, as best shown in the elevational views has a continuously smooth and curved profile to enable smooth cooperation with serrated portion 15.

The larger, movable grinding block 26 is hollow and has located within it a nut 28 co-operating with a threaded adjustment bolt 37. The head of the bolt 27 is a knob having indications thereon as to the desired size of pepper grinds to be dispensed. Turning the knob one way or the other will alter the size of the aperture 16 to thereby adjust how finely the produced grinds will be. If the knob 27 is turned the whole way anticlockwise, the bolt will be removed from nut 28 so that the grinding block 26 can be completely removed for the purpose of replenishing the chamber 13 with articles to be ground.

Figure 2:
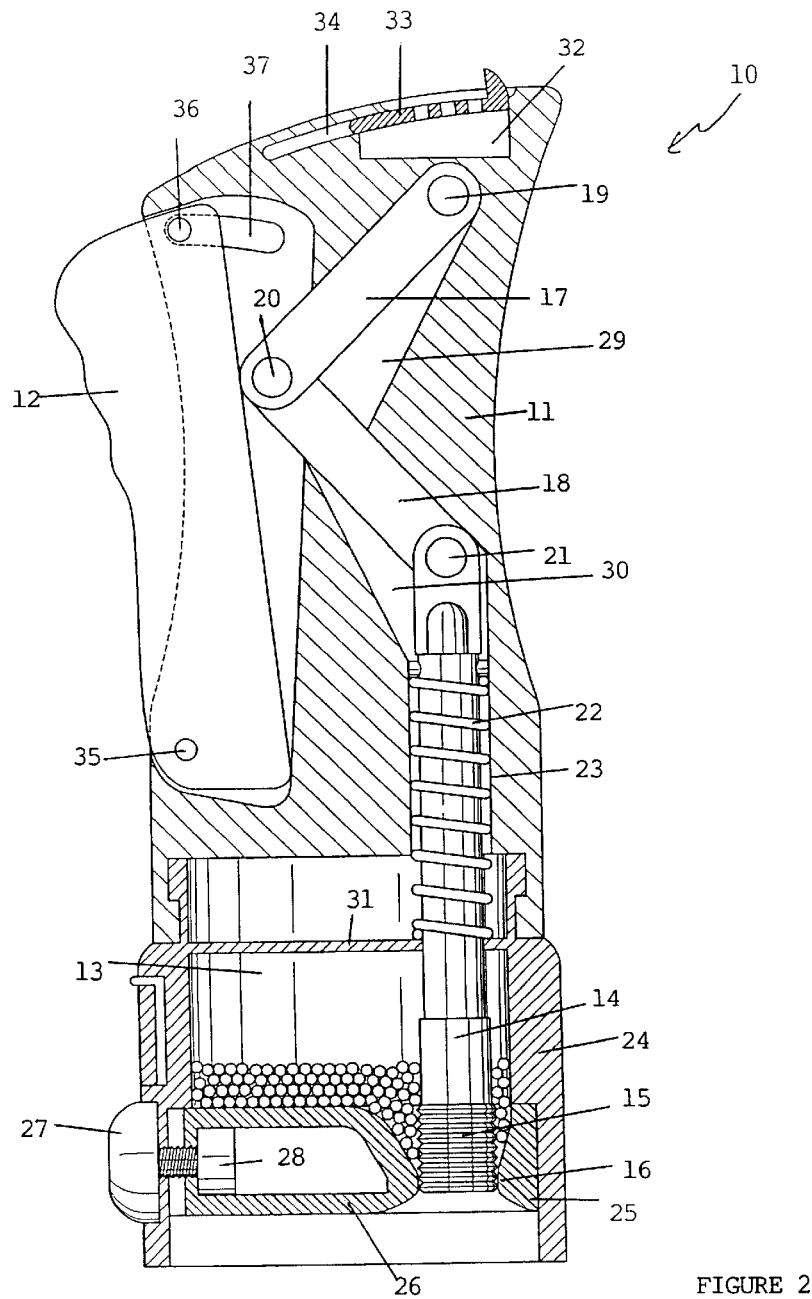
FIG. 2 is a schematic cross-sectional elevation of the pepper grinder of FIG. 1 showing its activation trigger in a rest position.
Figure 4:
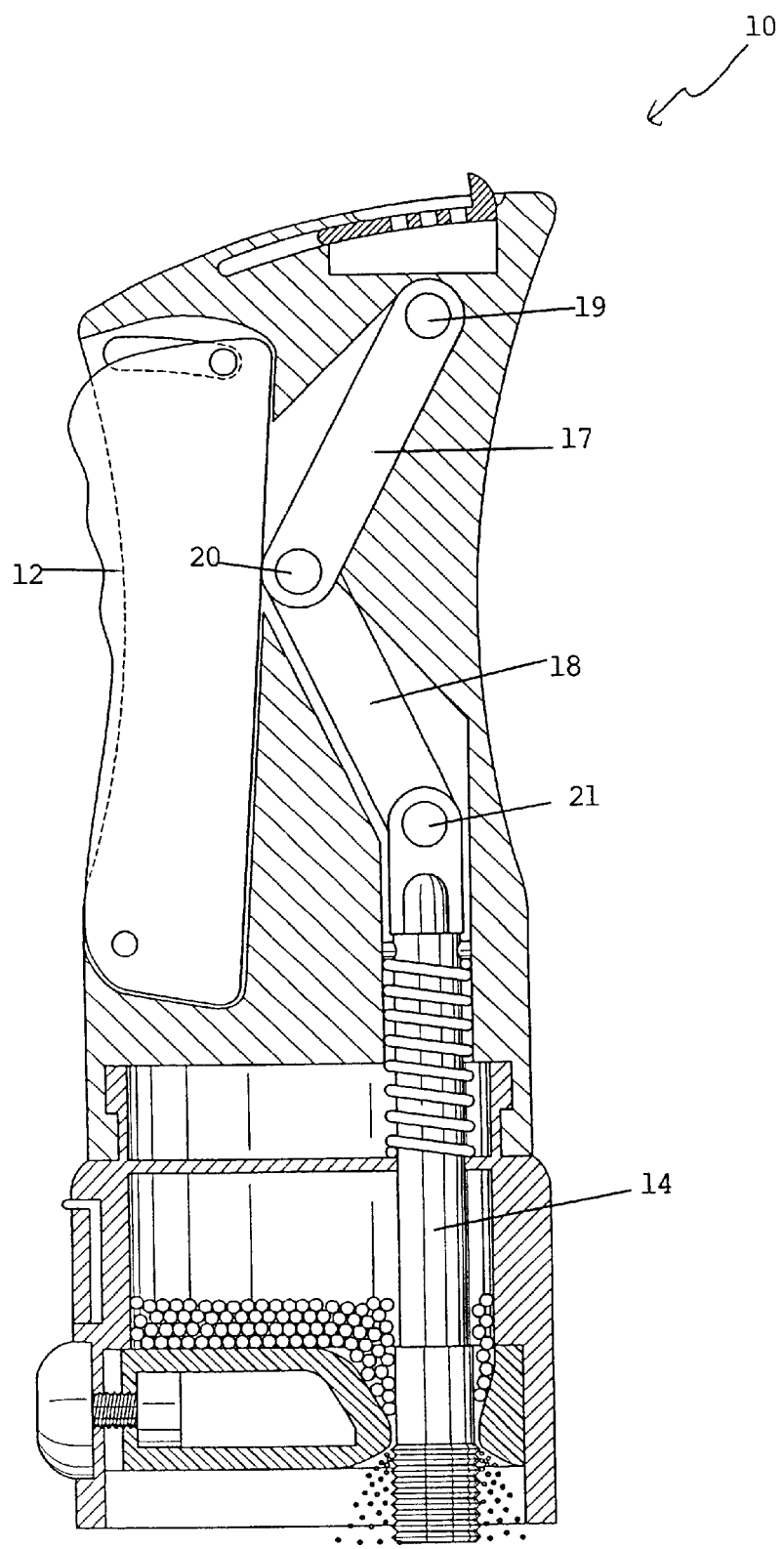
FIG. 4 is a schematic cross-sectional elevation of the pepper grinder of FIG. 1 showing its activation trigger in a depressed position.
Figure 5:
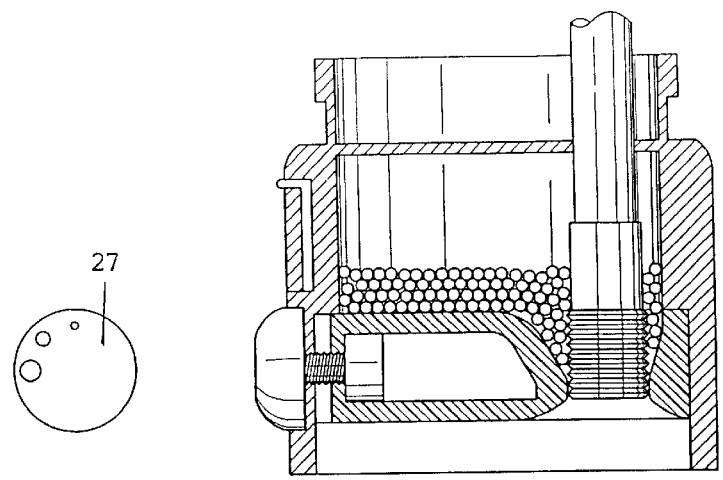
FIGS. 5, 6 and 7 are schematic cross-sectional elevational views of the pepper chamber of the grinder of FIGS. 1 to 4 and sequential stages in a reciprocation of the trigger.
Figure 6:
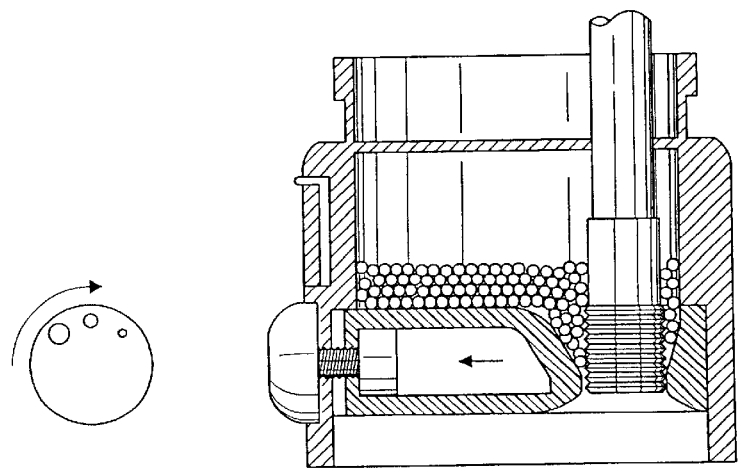
Figure 7:
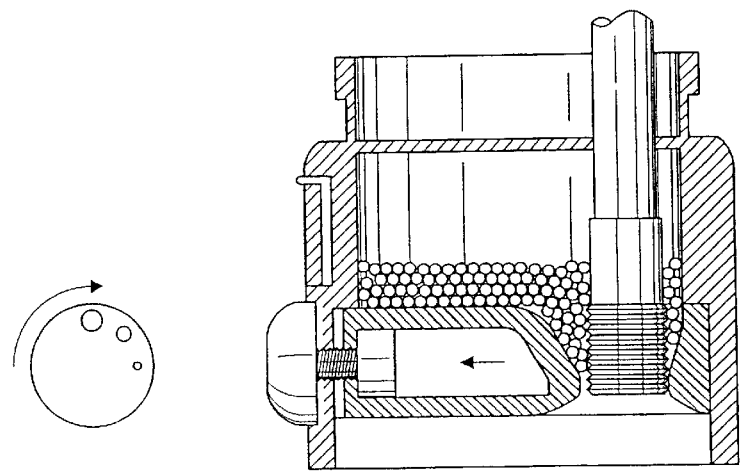

In use, the trigger 12 is repeatedly depressed whereupon sliding interengagement of the back of the trigger with the elbow 20 occurs. The elbow 20 then moves from the position depicted in FIG. 2 to the position shown in FIG. 4. At the same time, the elongate piston 14 moves down to compress the coil spring 22 as the serrated portion 15 moves through the aperture 16. The grinds are dispensed through the base of the grinder as shown in FIG. 4.

It should be appreciated that modifications and alterations obvious to those skilled in the art are not to be considered as beyond the scope of the present invention. For example, the elongate piston 14, instead of being circular in cross section, might be square, rectangular or triangular, but with serrations still extending the whole way about its periphery.

What is claimed is:

1. A condiment grinder comprising:
   a housing,
   a chamber attached to the housing for containing articles to be ground,
   a trigger attached to the housing,
   an elongate piston extending through the chamber and having serrations along a portion of its length,
   a linkage co-operative with the trigger and the piston to transmit reciprocal movement of the trigger to reciprocal movement of the piston, wherein the linkage includes a first link mounted pivotally to the housing and a second link connected pivotally to the piston, and the first and second links are hingedly interconnected to one another so that the trigger makes a sliding contact with the hinged interconnection of the first and second links, and
   a grinding aperture having an internal periphery, the aperture positioned adjacent to the chamber and co-operative throughout its internal periphery with the serrations of the piston to grind the articles upon reciprocation of the piston.

2. The grinder of claim 1, wherein the piston is substantially cylindrical.

3. The grinder of claim 1, wherein the serrated portion is substantially cylindrical.

4. The grinder of claim 1, wherein the aperture is formed between a pair of grinding blocks, each having a concave recess, the recesses facing one another to define said aperture.

5. The grinder of claim 4, wherein one of the grinding blocks is fixed with respect to the chamber and the other is movable toward or away from the fixed grinding block.

6. The grinder of claim 5, further including an adjustment knob co-operative with the movable grinding block.

7. The grinder of claim 1, wherein the piston fits within a bore of the housing.

8. The grinder of claim 7, further comprising a spring surrounding the piston and extending through the bore, one end of the spring bearing upon a wall of the chamber and the other end of the spring bearing on the piston to bias the piston to a position whereat the linkage moves the trigger to a rest position.

9. The grinder of claim 1, wherein the trigger is mounted pivotally to the housing.

* * * * *